(12) United States Patent
Murai et al.

(10) Patent No.: US 7,820,290 B2
(45) Date of Patent: Oct. 26, 2010

(54) WATER DISPERSIBLE CARBON FIBER AND WATER DISPERSIBLE CHOPPED CARBON FIBER

(75) Inventors: Shoji Murai, Ehime (JP); Masato Honma, Ehime (JP); Yoshiki Takebe, Ehime (JP); Yoshifumi Nakayama, Ehime (JP)

(73) Assignee: Toray Industries, Inc., Tokyo (JP)

( * ) Notice: Subject to any disclaimer, the term of this patent is extended or adjusted under 35 U.S.C. 154(b) by 470 days.

(21) Appl. No.: 11/660,202

(22) PCT Filed: Aug. 18, 2005

(86) PCT No.: PCT/JP2005/015076

§ 371 (c)(1),
(2), (4) Date: Feb. 15, 2007

(87) PCT Pub. No.: WO2006/019139

PCT Pub. Date: Feb. 23, 2006

(65) Prior Publication Data

US 2007/0269363 A1  Nov. 22, 2007

(30) Foreign Application Priority Data

Aug. 19, 2004  (JP)  ............................. 2004-239280

(51) Int. Cl.
*D01F 9/12* (2006.01)
*D21H 13/50* (2006.01)

(52) U.S. Cl. ................. 428/367; 162/157.1; 423/447.2; 429/44

(58) Field of Classification Search ............... 423/447.2, 423/415.1; 428/367, 357; 429/44; 162/157.1
See application file for complete search history.

(56) References Cited

U.S. PATENT DOCUMENTS

| 5,308,696 A | * | 5/1994 | Hanashita et al. | ............ 428/357 |
| 5,369,146 A | | 11/1994 | Miller et al. | ................. 523/215 |
| 7,135,516 B2 | | 11/2006 | Sugiura et al. | ............... 524/424 |
| 2002/0009588 A1 | * | 1/2002 | Matsuhisa et al. | ........... 428/367 |

FOREIGN PATENT DOCUMENTS

| EP | 0 365 727 A1 | | 5/1990 |
| EP | 0 965 679 A1 | | 12/1999 |
| JP | 03-174201 | * | 7/1991 |
| JP | 3-174201 A | | 7/1991 |
| JP | 5-205750 A | | 8/1993 |
| JP | 6-212565 A | | 8/1994 |
| JP | 8-296148 A | | 11/1996 |
| JP | 10-273882 A | | 10/1998 |
| JP | 2000-54269 A | | 2/2000 |
| JP | 2000-054269 A | * | 2/2000 |
| JP | 2002-242028 A | * | 8/2002 |
| JP | 2003-293264 A | | 10/2003 |
| WO | 03/012188 A1 | | 2/2003 |

* cited by examiner

*Primary Examiner*—Wayne Langel
*Assistant Examiner*—Brittany M Martinez
(74) *Attorney, Agent, or Firm*—Kubovcik & Kubovcik

(57) ABSTRACT

Water dispersible carbon fibers, (1) wherein the surface oxygen concentration (O/C) of each of the single fibers is 0.03 or more and less than 0.12 as measured by X-ray photoelectron spectroscopy and forming a first contact angle with water of 75° or less as measured by the Wilhelmy method; (2) wherein the O/C is 0.12 or more and less than 0.20 and forming a first contact angle with water of 65° or less as measured by the Wilhelmy method; or (3) wherein the O/C is 0.20 or more and 0.30 or less and forming a first contact angle with water of 55° or less as measured by the Wilhelmy method; and wherein a sizing agent containing a surfactant as a major component has adhered to the single fibers of each of the water dispersible carbon fibers.

15 Claims, No Drawings

WATER DISPERSIBLE CARBON FIBER AND WATER DISPERSIBLE CHOPPED CARBON FIBER

This application is a 371 of international application PCT/JP2005/015076 filed Aug. 18, 2005, which claims priority based on Japanese patent application No. 2004-239280 filed Aug. 19, 2004, which is incorporated herein by reference.

TECHNICAL FIELD

The present invention relates to a carbon fiber excellent in terms of convergence properties, which make it appropriate for cutting into chopped carbon fibers and allow handling of the same. The carbon fiber is also excellent in terms of dispersibility of fiber bundles, which makes it appropriate for an aqueous process such as a paper making process. In particular, the carbon fiber bundles display excellent dispersibility upon dispersion in an aqueous medium.

BACKGROUND ART

A carbon-fiber-reinforced composite material prepared by dispersing carbon fibers in a matrix resin is excellent in terms of its lightweight, mechanical properties, dimensional stability, electrical conductivity, and the like. Hence, such composite material is used in wide-ranging fields including those relating to automobiles, aircraft, electric or electronic devices, optical apparatuses, precision apparatuses, entertainment toys and games, home or office equipment and supplies, architectural materials, and the like. The demand for such composite material is increasing yearly.

As one of methods for obtaining a substrate for molding such carbon-fiber-reinforced composite material, a method (also referred to as a wet process) that involves processing carbon fiber in an aqueous process such as a paper-making process is employed. An example of such method involves dispersing chopped carbon fibers in an aqueous medium and then binding the chopped carbon fibers to a matrix resin through bonding, entangling, or suturing.

Furthermore in recent years, a paper-making process has been employed as a method for obtaining an electrode substrate that is used for a fuel cell or the like. For example, JP Patent Publication (Kokai) No. 5-205750 A (1993) (p. 1, lines 8 to 18) discloses a method that involves forming chopped carbon fibers into a sheet in a paper-making process and then baking the sheet.

Generally, in the case of a fiber-reinforced composite material, the longer the fiber length, the better the mechanical properties. Particularly in the case of such fiber-reinforced composite material prepared by dispersing reinforcing fibers in a matrix resin, the higher the degree of dispersion of reinforcing fibers in the form of single fibers, the greater the advantages in terms of uniformity of characteristics and qualities of surface appearance.

In paper-making processes, carbon fiber is cut into chopped carbon fibers in advance and then the chopped carbon fibers are dispersed in dispersion medium, followed by paper-making. Convergence properties are important in view of such cutting into chopped carbon fibers and in view of the handleability of the chopped carbon fibers. When convergence properties are poor, the carbon fiber may break at sites other than sites to be cut at the time of cutting into chopped carbon fibers because of poor handleability. Such cases result in fiber lengths shorter than a predetermined length. Furthermore, dispersion of fibers in the form of single fibers is important in paper-making processes, so that excellent dispersibility in an aqueous medium is required. Also for use in electrodes, the better the dispersibility, the greater the advantages in terms of electrical conductivity.

Accordingly, carbon fiber to be applied to a paper-making process is required to have both (1) convergence properties for maintaining the form of the carbon fiber upon handling prior to the paper-making process and (2) excellent dispersibility for rapid dispersion in the form of single fibers when they are introduced into an aqueous medium in the paper-making process and for suppressing additional cohesion.

In general, to enhance the handleability of carbon fiber, an epoxy resin or the like has adhered as a converging agent (sizing agent) to the carbon fiber in many cases. The resulting convergence properties are of a level that is too high for application of carbon fiber to a paper-making process, resulting in the inhibited dispersibility of the carbon fiber.

In view of such problem, JP Patent Publication (Kokai) No. 2003-293264 A (p. 2, line 2) proposes carbon fiber for paper making, to which a sizing agent comprising an aqueous compound has adhered such that the ratio of the number of oxygen atoms to the number of carbon atoms ($O_{1s}/C_{1s}$) in the vicinity of the carbon fiber surface ranges from 0.01 to 0.20.

However, application alone of a sizing agent comprising an aqueous compound results in insufficient dispersibility of the carbon fiber into an aqueous medium. Thus, a problem may arise such that an undispersed fiber bundle is formed on the surface upon substrate formation in a paper-making process.

DISCLOSURE OF THE INVENTION

Object to be Achieved by the Invention

In view of the above conventional technology background, an object of the present invention is to provide carbon fiber that has excellent convergence properties and dispersibility and thus is appropriate for an aqueous process.

Means to Achieve the Object

The present inventors have discovered that the above object can be achieved by considering the effect that is caused every time when the surface oxygen concentration (O/C: oxygen/carbon ratio) of a carbon fiber differs. Thus, the present inventors have completed the present invention.

Specifically, a carbon fiber provided according to the present invention is formed by the convergence of a plurality of single fibers and is: (1) a water dispersible carbon fiber, wherein the surface oxygen concentration (O/C) of each of the single fibers is 0.03 or more and less than 0.12 as measured by X-ray photoelectron spectroscopy (ESCA) and a sizing agent containing a surfactant as a major component has adhered to the single fibers, such carbon fiber forming a first contact angle with water of 75° or less as measured by the Wilhelmy method; (2) a water dispersible carbon fiber, wherein the surface oxygen concentration (O/C) is 0.12 or more and less than 0.20 and a sizing agent containing a surfactant as a major component has adhered to the single fibers, such carbon fiber forming a first contact angle with water of 65° or less as measured by the Wilhelmy method; or (3) a water dispersible carbon fiber, wherein the surface oxygen concentration (O/C) is 0.20 or more and 0.30 or less and a sizing agent containing a surfactant as a major component has adhered to the single fibers, such carbon fiber forming a first contact angle with water of 55° or less as measured by the Wilhelmy method.

EFFECT OF THE INVENTION

Water dispersible carbon fiber of the present invention has both (1) convergence properties and (2) dispersibility, which are suitable properties for production of a substrate for paper making. The thus obtained substrate for paper making, in which single fibers are more uniformly dispersed compared with conventional carbon fibers, is free from defects such as unevenness on the substrate surface for paper making.

BEST MODE FOR CARRYING OUT THE INVENTION

The present invention is further specifically described as follows.

In the present invention, unless particularly limited, the term "carbon fiber" may refer to single fibers forming a carbon fiber bundle, or to such a bundle formed by convergence of single fibers.

In the present invention, the term "convergence properties" with reference to a carbon fiber means properties allowing maintenance of the form of carbon fiber at the time of handling prior to an aqueous process, such as during cutting the carbon fiber.

As one of methods for obtaining a substrate for molding a carbon-fiber-reinforced composite material, a method that involves processing a carbon fiber via an aqueous process (a wet process) is employed. Furthermore, in recent years, a paper-making process (that is an aqueous processes) is also employed as one of methods for obtaining an electrode substrate that is used for fuel cells or the like.

Furthermore, in the present invention, the term "dispersibility" with reference to carbon fiber refers to a property for rapidly dispersing carbon fiber in the form of single fibers when the fibers are introduced into an aqueous medium during an aqueous process and suppressing additional cohesion. In particular, dispersion of carbon fiber in the form of single fibers is important in paper-making processes, so that excellent dispersion properties with respect to an aqueous medium is required. Also for use in electrodes, the greater the degree of dispersion properties, the greater the advantageous in terms of electrical conductivity.

As described above, carbon fiber is required to have both excellent convergence properties and excellent dispersibility in an aqueous medium.

The term "aqueous process," for which the carbon fiber of the present invention is suitably used, refers to a process that comprises causing the carbon fiber to come into direct contact with an aqueous medium, so as to process the fiber into a substrate or a molding material in a form selected from among forms such as sheet, mat, strand, fabric, and the like. A preferable example of a production method comprises the steps of: immersing carbon fiber in aqueous medium; dispersing the carbon fiber using a mechanical means such as agitation; and re-constructing the carbon fiber into a specific form.

Specific examples of such a useful aqueous process include a method for producing a non-woven fabric mat and an electrode substrate using a paper-making method and a method for producing a thermoplastic prepreg using a powder impregnation method.

Here, the term "paper" refers to cloth prepared by dispersing and depositing fibers to form a sheet product (web) with a specific thickness and form stability.

The water dispersible carbon fiber of the present invention is represented by the following aspects (1) to (3).

According to the first aspect concerning the water dispersible carbon fiber of the present invention, a plurality of single fibers are converged, the surface oxygen concentration (O/C) of each of the single fibers is 0.03 or more and less than 0.12 as measured by X-ray photoelectron spectroscopy (ESCA), a sizing agent containing a surfactant as a major component has adhered to the single fibers, and the carbon fiber forms a first contact angle with water of 75° or less, preferably 72° or less, and further preferably 70° or less as measured by the Wilhelmy method.

A first contact angle of greater than 75° may result in insufficient dispersibility of the carbon fiber in an aqueous medium or secondary cohesion of dispersed fibers. Furthermore, the lower limit of the first contact angle is not particularly limited. The preferable range of the first contact angle is 10° or more, for example.

Furthermore, in view of enhancement of dispersibility in an aqueous medium, which is an object of the present invention, the surface free energy $\gamma_0$ of each of the single fibers preferably ranges from 30 mJ/m$^2$ to 50 mJ/m$^2$, and the polar component $\gamma_{OP}$ of the surface free energy preferably ranges from 10 mJ/m$^2$ to 20 mJ/m$^2$, as measured by the Wilhelmy method. The surface free energy $\gamma_0$ more preferably ranges from 35 mJ/m$^2$ to 45 mJ/m$^2$, and the polar component $\gamma_{OP}$ of the surface free energy more preferably ranges from 12 mJ/m$^2$ to 18 mJ/m$^2$, as measured by the Wilhelmy method. Furthermore, the surface free energy $\gamma_1$ after removal of the surfactant is preferably $\gamma_0$ or less.

According to the second aspect concerning the water dispersible carbon fiber of the present invention, a plurality of single fibers are converged, the surface oxygen concentration (O/C) of each of the single fibers is 0.12 or more and less than 0.20 as measured by X-ray photoelectron spectroscopy (ESCA), a sizing agent containing a surfactant as a major component has adhered to the single fibers, and the carbon fiber forms a first contact angle with water of 65° or less, preferably 62° or less, and further preferably 60° or less, as measured by the Wilhelmy method.

A first contact angle of greater than 65° may result in insufficient dispersibility of the carbon fiber in an aqueous medium or secondary cohesion of dispersed fibers. Furthermore, the lower limit of the first contact angle is not particularly limited. The preferable range of the first contact angle is 10° or more, for example.

Furthermore, in view of enhancement of dispersibility in an aqueous medium, which is the object of the present invention, the surface free energy $\gamma_0$ of each of the single fibers preferably ranges from 40 mJ/m$^2$ to 60 mJ/m$^2$ and the polar component $\gamma_{OP}$ of the surface free energy preferably ranges from 20 mJ/m$^2$ to 30 mJ/m$^2$, as measured by the Wilhelmy method. The surface free energy $\gamma_0$ more preferably ranges from 45 mJ/m$^2$ to 55 mJ/m$^2$ and the polar component $\gamma_{OP}$ of the surface free energy more preferably ranges from 22 mJ/m$^2$ to 28 mJ/m$^2$, as measured by the Wilhelmy method. Furthermore, the surface free energy $\gamma_1$ after removal of the surfactant is preferably $\gamma_0$ or less.

According to the third aspect concerning the water dispersible carbon fiber of the present invention, a plurality of single fibers are converged, the surface oxygen concentration (O/C) of each of the single fibers is 0.20 or more and 0.30 or less as measured by X-ray photoelectron spectroscopy (ESCA), the sizing agent containing a surfactant as a major component has adhered to the single fibers, and the carbon fiber forms a first contact angle with water of 55° or less, preferably 52° or less, and further preferably 50° or less, as measured by the Wilhelmy method.

A first contact angle of greater than 55° may result in insufficient dispersibility of the carbon fiber in an aqueous medium or secondary cohesion of dispersed fibers. Furthermore, the lower limit of the first contact angle is not particularly limited. The preferable range of the first contact angle is 10° or more, for example.

Furthermore, in view of enhancement in dispersibility in aqueous medium, which is the object of the present invention, the surface free energy $\gamma_0$ of each of the single fibers preferably ranges from 50 mJ/m$^2$ to 70 mJ/m$^2$ and the polar component $\gamma_{0P}$ of the surface free energy preferably ranges from 30 mJ/m$^2$ to 40 mJ/m$^2$, as measured by the Wilhelmy method. The surface free energy $\gamma_0$ more preferably ranges from 55 mJ/m$^2$ to 65 mJ/m$^2$ and the polar component $\gamma_{0P}$ of the surface free energy more preferably ranges from 32 mJ/m$^2$ to 38 mJ/m$^2$, as measured by the Wilhelmy method. Furthermore, the surface free energy $\gamma_1$ after removal of the surfactant is preferably $\gamma_0$ or less.

As carbon fiber to be used in the present invention, PAN-based, pitch-based, and rayon-based carbon fibers and the like having high strength and high modoluses of elasticity can be used. In view of the balance between the resulting strength and modulus of elasticity, particularly a PAN-based carbon fiber is further preferable. In view of the mechanical properties of a molding, a carbon fiber that can be used herein has a tensile modulus of elasticity preferably ranging from 200 GPa to 800 GPa and further preferably ranging from 220 GPa to 800 GPa.

The average diameter of the carbon fiber is not particularly limited. However, in view of the mechanical properties of the obtained molding, such diameter preferably ranges from 1 μm to 20 μm and more preferably ranges from 3 μm to 15 μm.

The number of single fibers to be converged to form the carbon fiber of the present invention is not particularly limited. The number of such single fibers that can be used herein ranges from 100 to 350,000. In view of the balance between dispersibility and productivity of the carbon fiber and in view of the balance between dispersibility and handleability, the number of single fibers to be converged preferably ranges from 10,000 to 60,000 and further preferably ranges from 20,000 to 50,000.

Carbon fiber to be used in the present invention may be subjected to liquid phase or vapor phase surface oxidization treatment in advance. As a method for surface oxidization treatment, a method that involves subjecting carbon fiber as an anode to oxidation treatment in an electrolytic aqueous solution is preferable because of its advantages, including its convenience and the fact that it rarely experiences a decrease in strength. A solution for electrolytic treatment is not particularly limited, and may be a sulfuric acid solution or an ammonium carbonate solution, for example. Here, to minimize damage to the carbon fiber, an appropriate example of electricity for electrolytic treatment ranges from 0 (no treatment) to 100 coulombs per gram of carbon fiber.

In each aspect concerning the carbon fiber of the present invention, the surface oxygen concentration can be mainly adjusted with electricity (for electrolytic treatment) employed for surface oxidization treatment. Here, lower electricity for electrolytic treatment can lead to lesser degrees of interaction among single carbon fibers. Specifically, a surface oxygen concentration O/C of the carbon fiber ranging from 0 to 0.1 is preferably employed for use in electrodes. However, depending on the purpose of a resulting molding or a product, higher electricity (for electrolytic treatment) is required for surface treatment in order to enhance interaction with a matrix. Specifically, a surface oxygen concentration O/C of the carbon fiber ranging from 0.1 to 0.3 is preferably employed. Accordingly, when the carbon fiber of the present invention has a different surface oxygen concentration (O/C), both convergence properties and dispersibility can be achieved as targeted in the present invention by taking the effect resulting from such difference into consideration.

Such surface oxygen concentration of carbon fiber can be determined by X-ray photoelectroscopy. A specific method for X-ray photoelectroscopy is exemplified in the examples. As a cross-sectional shape of carbon fiber to be used in the present invention, a perfectly circular shape, a flat shape, an irregular shape, or the like can be used. Furthermore, in view of dispersibility, an irregular cross-section is preferably used. In view of productivity, a perfectly circular cross-section is preferably used. Moreover, the carbon fiber may also have unevenness (rises and falls) on its surface. The degree of such unevenness can be confirmed using as an concentration an arithmetic average roughness (Ra) measured using an AFM (atomic force microscope). To further enhance dispersibility, Ra is preferably 20 nm or more and more preferably 25 nm or more.

The carbon fiber of the present invention can achieve excellent dispersibility through adhesion of a sizing agent containing a surfactant as a major component. Furthermore, in the case of carbon fiber having a different surface oxygen concentration, the object of the present invention can be achieved through adhesion of a surfactant appropriate for each surface condition and shape.

A surfactant that has adhered to the carbon fiber surface improves wettability with regard to an aqueous medium and suppresses secondary cohesion of carbon fibers in such aqueous medium. At the same time, when convergence properties of carbon fiber are enhanced, fiber dispersion failures can be suppressed.

In view of enhancement in dispersibility, a nonionic surfactant with an HLB (Hydrophile-Lipophile Balance) value ranging from 10 to 20 and more preferably ranging from 11 to 19 is preferably used as a surfactant to be used for the carbon fiber of the present invention.

Here, an HLB value can be obtained by calculating a number average molecular weight Mn and a formula weight Mn1 of a hydrophilic group portion based on the structural formula of a single compound and then using the following formula.

$$HLB = 20 \times Mn1/Mn$$

Furthermore, a more preferable means for stable expression of the excellent dispersibility of the carbon fiber of the present invention involves the combined use of a surfactant (a) with an HLB value ranging from 10 to 14 and a surfactant (b) with an HLB value ranging from 14 to 20. A further preferable means for the same involves the combined use of a surfactant (a) with an HLB value ranging from 10 to 13 and a surfactant (b) with an HLB value ranging from 15 to 19. The mixture ratio of (a) to (b) to be used herein preferably ranges from 1:1 to 9:1 in view of the balance between dispersibility and convergence properties.

In view of enhancement in affinity of the carbon fiber of the present invention for an aqueous medium, a surfactant preferably contains a polyoxyalkylene group with a formula weight ranging from 600 to 4000 and more preferably ranging from 700 to 3000. Here, a polyoxyalkylene group is a skeleton composed of independent repetition of C2-4 alkylene oxide or a polyoxyalkylene skeleton formed through copolymerization of C2-4 alkylene oxide. Preferable specific examples of such skeleton include a polyethylene oxide skeleton and a polypropylene oxide skeleton. Moreover, when a surfactant contains a plurality of polyoxyalkylene groups, the formula weight thereof can be calculated from the total amount of the groups.

Furthermore, in view of affinity for the carbon fiber of the present invention, a surfactant to be used for such carbon fiber preferably has a hydrophobic portion composed of a hydrocarbon with a carbon number of 6 or more, more preferably of 8 or more, and particularly preferably of 10 or more.

In addition, it is preferable for selection of a surfactant to consider the surface oxygen concentration (O/C) of the carbon fiber to be used. Specifically, in cases of an O/C of 0.03 or more and less than 0.12, it is preferable to use a surfactant having a hydrophobic portion composed of a long-chain alkyl group, for example. In cases of an O/C of 0.12 or more and less than 0.20, it is preferable to use a surfactant having a hydrophobic portion with an aromatic ring structure or a hydrocarbon with a ring skeleton, for example. In cases of an O/C of 0.20 or more and 0.30 or less, it is preferable to further use amphoteric surfactants in combination, for example. However, relevant examples are not limited to the above.

A sizing agent to be used in the present invention is preferably comprised of the above surfactant as a major component in an amount that is 70% by weight or more, more preferably 90% by weight or more, and particularly preferably 95% by weight or more.

Furthermore, in view of the balance between convergence properties and dispersibility, the amount of a sizing agent that adheres to the carbon fiber preferably ranges from 0.01% by weight to 10% by weight, more preferably ranges from 0.1% by weight to 5% by weight, and further preferably ranges from 1% by weight to 3% by weight.

In addition, a sizing agent may also contain known components of a sizing agent, such as an antifoaming agent, an emulsifier, an epoxy resin, a urethane resin, an acrylic resin, and various thermoplastic resins, as long as such components do not damage the object of the present invention.

Examples of a method for causing adhesion of a sizing agent are not particularly limited and include a method that involves preparing a solution of a sizing agent, immersing carbon fiber in the solution or dripping or spraying the solution onto carbon fiber, and then drying and removing the solvent, and the like.

Furthermore, examples of a method for removing a sizing agent are not particularly limited and include a method that involves washing a sizing agent with a solvent in which the sizing agent may become dissolved and a method that involves causing a sizing agent to disappear by thermal decomposition. Specific techniques for the same are exemplified in the following examples.

In the carbon fiber according to each aspect of the present invention, a first contact angle formed with water measured by Wilhelmy method can be within a specific range through adhesion of a sizing agent containing a surfactant as a major component. The "Journal of the Surface Science" (vol. 21, No. 10, pp. 643-650 (2000)) discloses the Wilhelmy method, which involves introducing a thin substrate into a liquid, measuring force F that is applied to the substrate, and then calculating the contact angle. Specific techniques for the same are exemplified in the following examples.

In addition, a change in surface free energy, which takes place after adhesion of a sizing agent, can be evaluated by comparing surface free energy $\gamma_1$ after the removal of the sizing agent with $\gamma_0$.

Furthermore, surface free energy measured by the Wilhelmy method can be obtained based on each contact angle measured by the Wilhelmy method using the Owens-Wendt equation for approximation. Regarding Owens-wendt equation for approximation, the "Journal of Applied Polymer Science" (vol. 13, pp. 1741-1747 (1969)) discloses the following calculation method.

Specifically, the contact angles $\theta$ of at least 2 types of liquids, the surface tension $\gamma_1$ (specific value) of each liquid, polar surface-tension component $\gamma_{1p}$ (specific value), and non-polar surface-tension component $\gamma_{1d}$ (specific value) are assigned in the following equation. A binary linear equation for the polar component $\gamma_{sd}$ and the non-polar component $\gamma_{sp}$ of the surface free energy of a specimen is established.

$$\gamma_1(1+\cos\theta)=2(\gamma_{sd}\cdot\gamma_{1d})^{0.5}+2(\gamma_{sp}\cdot\gamma_{1p})^{0.5}$$

With $\gamma_{sd}$ and $\gamma_{sp}$, the surface free energy $\gamma_0=\gamma_{sd}+\gamma_{sp}$ to be used in the present invention and the polar component $\gamma_{0P}=\gamma_{sd}$ of the surface free energy can be obtained.

A preferable form of the carbon fiber of the present invention is: chopped carbon fiber that is prepared by cutting a strand (a continuous fiber) into pieces of a predetermined length when it is used for a paper-making process. Such a strand form is preferably used when the carbon fiber is used for a powder impregnation process. The fiber length L of a chopped carbon fiber is not particularly limited. A chopped carbon fiber with a fiber length ranging from 3 mm to 30 mm can be used. Moreover, in view of the dispersibility of the carbon fiber, the following formula representing the relationship between fiber length L (mm) and the surface free energy $\gamma_0$ of the carbon fiber is preferably satisfied.

$$L \leq -0.55 \times \gamma_0 + 45$$

More preferably, the following formula representing the relationship between the same is satisfied.

$$L \leq -0.55 \times \gamma_0 + 40$$

Further preferably, the following formula representing the relationship between the same is satisfied.

$$L \leq -0.55 \times \gamma_0 + 32$$

Furthermore, fiber dispersion time (the time required for the thus obtained chopped carbon fiber to be dispersed) can be measured by the following method for evaluating dispersibility in water. Dispersion time is evaluated with this method by preparing approximately 2000 cc of water (purified water) in a transparent vessel with a capacity of 3 liters or more and then measuring the longest time required for approximately 0.01 g of chopped carbon fiber (sample) to be dispersed in water. At this time, water as a medium is stirred at approximately 20 rpm and the sample is allowed to float on the water surface. After the sample is allowed to float on the surface, the time during which the carbon fiber can be dispersed to the single-fiber level while sinking below water is measured using a stopwatch. At this time, when the carbon fiber can be dispersed to a level such that each carbon fiber bundle consists of less than 10 single fibers. It can be concluded that a successful dispersion at the single-fiber level has been achieved. Specific techniques for the same are exemplified in the following examples.

The dispersion time of the chopped carbon fibers of the present invention is preferably 40 seconds or less, more preferably 35 seconds or less, and further more preferably 30 seconds or less.

The carbon fiber obtained according to the present invention can be suitably used for a fiber-reinforced resin through mixing with a matrix resin. Moreover, the carbon fiber has electrical conductivity so that it can be suitably used for electrode substrates, plane heating elements, static eliminator sheets, and the like.

EXAMPLES

The present invention will be described in more detail by the following examples, which are not intended to limit the invention.

[Determination of Characteristics]

Techniques for determining various characteristics of the carbon fiber of the present invention explained above are as follows.

(1) Surface Oxygen Concentration (O/C) of Carbon Fiber

The surface oxygen concentration (O/C) was obtained by X-ray photoelectron spectroscopy according to the following procedures. Single carbon fibers (samples) were cut to an appropriate length and then spread on a stainless support for samples. The photoelectron escape angle was set to 90° and $MgK_{\alpha1, 2}$ was used as the X-ray source. The interior of the sample chamber was kept at a vacuum degree of $1\times10^{-8}$ Torr. As compensation for the peaks accompanying the electrostatic charge during measurement, the binding energy value of the main peak $C_{1s}$ was matched to 284.6 eV. The $C_{1s}$ peak area was obtained by providing a linear base line in the range between 282 eV and 296 eV. The $O_{1s}$ peak area was obtained by providing a linear baseline in the range between 528 eV and 540 eV. The surface oxygen concentration O/C was represented by an atomic ratio calculated by dividing the ratio of the above $O_{1s}$ peak area to the above $C_{1s}$ peak area by the relative sensitivity factor (sensitivity correction value) unique to the apparatus used. In this example, an ESCA-750 (produced by Shimadzu Corporation) was used as an X-ray photoelectron spectroscopy apparatus and the relative sensitivity factor (sensitivity correction value) unique to the apparatus was 2.85.

(2) Arithmetic Average Roughness (Ra) of Carbon Fiber

Ra was determined by the following procedures. Single carbon fibers to be used as samples were cut to a length of approximately several millimeters. Each cut single fiber was fixed on a substrate (silicon wafer) using silver paste and then a 3-dimensional surface shape image of the central part of the fiber was obtained using an atomic force microscope (AFM). For the images obtained through observation of one part per single fiber, the roundness of each fiber section was approximated with a cubic curve. Arithmetic average roughness was calculated for each of the thus obtained whole images. For 5 single fibers, arithmetic average roughness was obtained similarly and the results were averaged, thereby obtaining an arithmetic average roughness Ra for each example of the present invention. Furthermore, in the examples, NanoScope IIIa (produced by Digital Instuments) was used as an atomic force microscope and determination was performed under the following conditions using a Dimension 3000 stage system.

Scanning mode: tapping mode
Probe: silicon cantilever
Scanning range: 0.6 μm×0.6 μm
Scanning speed: 0.3 Hz
Number of pixels: 512×512
Environment for measurement: air room temperature (3) Amount of Sizing Agent That Has Adhered Approximately 5 g of carbon fiber to which a sizing agent had adhered was collected as a sample and then introduced into a thermostable vessel. Next, the vessel was dried at 120° C. for 3 hours. The vessel was cooled in a desiccator to room temperature while paying attention not to cause moisture absorption. The sample was weighed and the weight was designated as $W_1$ (g). Subsequently, the sample in the vessel was heated under a nitrogen atmosphere at 450° C. for 15 minutes. The sample was similarly cooled in a desiccator to room temperature while paying attention not to cause moisture absorption. The sample was weighed and the weight was designated as $W_2$ (g). After the above treatment, the amount of the sizing agent that had adhered to the carbon fiber sample was obtained by the following formula.

Furthermore, in the examples of the present invention, the amount of sizing agent that had adhered was determined in three instances and the mean value thereof was employed as the amount of the sizing agent that had adhered. Amount of sizing agent that had adhered (% by weight)=$100\times\{(W_1-W_2)/W_2\}$ (4) Method for Removing Sizing Agent The following procedures (a) to (c) were repeated twice, thereby removing the sizing agent from each carbon fiber. (a) Approximately 1 g of carbon fiber to be used as a sample was introduced into a vessel containing 100 cc of a solvent in which a sizing agent such as acetone can be dissolved and then subjected to 60 minutes of ultrasonic washing. (b) The carbon fiber sample was removed from the vessel. The carbon fiber sample was entirely washed at three or more separate instances using a wash bottle and 50 cc of acetone. (c) Furthermore, the carbon fiber sample was washed entirely at three or more separate instances using a wash bottle and 100 cc of distilled water. After removal of the sizing agent, the sample was dried at 120° C. for 3 hours.

(5) Contact Angle Formed By Carbon Fiber and Water

Each contact angle between each carbon fiber and water was measured by the Wilhelmy method according to the following procedures. In addition, in the examples of the present invention, DCAT11 (produced by DataPhysics) was used as an apparatus for measuring such contact angle and FH12 (a plate, the surface of which had been coated with an adhesive substance) was used as a holder for samples only. Single carbon fibers, to be used as samples, were cut to obtain 8 single fibers with a length of 12 mm. The cut single fibers were attached onto a FH12 holder (for samples only) in parallel with 2-mm to 3-mm spaces between the single fibers. Next, the single fiber tips were cut to the same length and then the holder was set in DCAT11. For measurement, each cell containing a liquid medium in addition to purified water was moved closer at a rate of 0.2 mm/s to each of the lower ends of 8 single fibers, so that each single fiber tip was immersed 5 mm from the tip. The single fibers were removed at a rate of 0.2 mm/s. This procedure was repeated 4 times or more. Force F that was applied to each single fiber while the fiber was being immersed in an aqueous solution (that is, while the fiber was moving downward) was measured using an electronic balance. Contact angle θ was calculated by the following formula using the thus measured value.

$$\cos\theta = (\text{force } F \text{ (mN) applied to 8 single fibers})/(8 \text{ (the number of single fibers)} \times \text{circumference } (m) \text{ of a single fiber} \times \text{liquid surface tension } (mJ/m^2))$$

In the calculation of contact angle θ, a mean value (contact angle) obtained by 1 to 4 instances of the above measurement is generally used. In the examples of the present invention, the particular contact angle obtained by such first measurement was obtained as the first contact angle by separate calculation. This is because a more accurate result can be obtained through calculation of the first contact angle, since excessively adhering components are eluted in a liquid when a component with high solubility in a liquid medium such as purified water has adhered.

In addition, measurement was performed for single fibers sampled from 3 different positions of a carbon fiber bundle.

Specifically, the mean value of contact angles was obtained using a total of 24 single fibers per carbon fiber bundle specimen.

(6) Surface Free Energy of Carbon Fiber

According to procedures similar to those for the above contact angle, the surface free energy of a carbon fiber was obtained as follows. Each contact angle between single fibers of carbon fiber and each liquid medium (water, ethylene glycol, or tricresol phosphate) was measured and calculated by the Wilhelmy method. Based on the thus obtained numerical value, surface free energy $\gamma_0$ and polar component $\gamma_{0P}$ of the surface free energy were calculated using the following Owens equation for approximation. Moreover, surface free energy calculated using carbon fiber obtained by the above method (4) for removing a sizing agent from carbon fiber was designated as $\gamma_1$.

The Owens equation for approximation (composed of: polar surface-tension component specific to each liquid; non-polar surface-tension component specific to each liquid; and contact angle θ) was obtained by squaring gradient "a" and section "b" when the surface-tension component (value specific to each medium) of each liquid medium and a relevant contact angle were assigned and plotted in X and Y and then collinear approximation was performed by the method of least squares.

$Y=a \cdot X+b$ $X=\sqrt{\text{(polar surface-tension component } (mJ/m^2) \text{ of liquid)}}/\sqrt{\text{(non-polar surface-tension component } (mJ/m^2) \text{ of liquid)}}$ $Y=(1+\cos\theta)\text{(liquid surface tension }(mJ/m^2))/2\sqrt{\text{(non-polar surface-tension component }(mJ/m^2)\text{ of liquid)}}$ $\gamma_{0P}(mJ/m^2)=a^2$ $\gamma_0(mJ/m^2)=a^2+b^2$ The polar and non-polar surface-tension components of each liquid medium used herein had the following specific values.

Purified water (PW):

Surface tension: 72.8 mJ/m²; polar component: 51.0 mJ/m²; and non-polar component: 21.8 mJ/m²

Ethylene glycol (EG):

Surface tension: 48.0 mJ/m²; polar component: 19.0 mJ/m²; and non-polar component: 29.0 mJ/m²

Tricresol phosphate (TP):

Surface tension: 40.9 mJ/m²; polar component: 1.7 mJ/m²; and non-polar component 39.2 mJ/m²

(7) Test for Evaluating Water Dispersibility

A carbon fiber bundle was cut to a length of approximately 6.4 mm. The resulting chopped carbon fiber was used as a sample for evaluation. First, approximately 2000 cc of water was prepared in a transparent cylindrical vessel with a diameter of approximately 150 mm and a height of approximately 300 mm.

Approximately 0.01 g of chopped carbon fiber to be used as a sample was introduced into the above vessel and then allowed to stand at room temperature for 10 seconds. The sample was stirred using a Teflon (trademark) stirring bar (50 mm in total length, 8 mm in diameter, standard type) at 200 rpm for 20 seconds. The stirred sample (solution) was poured into a Buchner funnel (90 mm in diameter) provided with a paper filter, so as to filtrate the chopped carbon fiber sample. The residue on the filter was observed under a microscope. The number of carbon fiber bundles each consisting of 10 or more single fibers was determined; that is, the number of carbon fiber bundles (referred to as undispersed fiber bundles) for which dispersion had been insufficient was determined. In the examples of the present invention, counting was performed in 20 instances by procedures similar to the above, the total number of undispersed fiber bundles was divided by 20 (number of samples), and then the thus obtained mean value was evaluated with the following 4-grade evaluation:

"∘∘" and "∘" mean "pass," and "Δ" and "x" mean "fail."

∘∘: Less than 1 undispersed fiber bundle

∘: 1 or more and less than 5 undispersed fiber bundles

Δ: 5 or more and less than 10 undispersed fiber bundles x: 10 or more undispersed fiber bundles Furthermore, fiber dispersion time was evaluated according to the following procedures.

Approximately 0.01 g of chopped carbon fiber to be used as a sample was allowed to float on the water surface of the above vessel. At the same time, the sample was continuously stirred using a Teflon (trademark) stirring bar (50 mm in total length, 8 mm in diameter, standard type) at 20 rpm. Changes with time during which the chopped carbon fiber sample was sinking below water were visually evaluated. Regarding evaluation standards, the time (seconds) required for the carbon fiber bundle to become sufficiently dispersed in water was measured. It was determined that fiber dispersion had progressed to a sufficient degree when a carbon fiber had dispersed into bundles each consisting of less than 10 single fibers. In the examples of the present invention, procedures similar to the above procedures were performed in 20 instances and the dispersion time was obtained by dividing the sum of times required for fibers to be dispersed by 20 to obtain a mean value (dispersion time). The shorter the dispersion time, the better the dispersibility. Furthermore, when dispersion was insufficient even after 300 seconds, measurement was stopped.

(8) Evaluation of Convergence Properties

A carbon fiber bundle was cut to a predetermined length. The thus chopped carbon fiber strands were used as samples for evaluation. Approximately 70 g (weighed value: M(g)) of chopped carbon fiber was collected and then introduced into a 500-ml glass measuring cylinder (approximately 50 mm in diameter and approximately 350 mm in height). Next, the measuring cylinder was subjected to 60 instances of tapping treatment on a rubber sheet with a thickness of 4 mm from a height of 2.54 cm. Chopped strand volume V (ml) within the measuring cylinder was read. After the treatment, packed bulk density was obtained by the following formula.

$D$: packed bulk density $D=M/V$

In the examples of the present invention, measurement was performed in 3 instances using procedures similar to the above, and then packed bulk densities were divided by the number of measurements taken to calculate a mean bulk density. The higher the bulk density, the better the convergence properties. Furthermore, convergence properties were conveniently evaluated with the following 2-grade evaluation: "∘" means "pass" and "x" means "fail."

∘: mean bulk density of 0.3 or higher. Usable without problems.

x: mean bulk density of less than 0.3. Use is limited in terms of convergence properties.

[Preparation of Surfactant]

Reference Example 1

80 parts by weight of polyoxyethyleneoleylether (number average molecular weight of 600 and HLB of 11.3) represented by the following chemical formula (I) and 20 parts by weight of polyoxyethylenealkylether (number average molecular weight of 1300 and HLB of 17) represented by the following chemical formula (II) were mixed to obtain a surfactant (A). An aqueous solution of the surfactant (A) was prepared at a concentration of 20% by weight.

$$C_{18}H_{35}O-(CH_2CH_2O)_8-H \quad (I)$$

$$C_{12}H_{25}O-(CH_2H_2O)_{25}-H \quad (II)$$

Reference Example 2

Polyoxyethyleneoleylether surfactant (B) (number average molecular weight of 600 and HLB of 11.3) represented by the above chemical formula (I) was prepared at a concentration of 2% by weight.

Reference Example 3

An aqueous solution of a polyoxyethylenesorbitan surfactant (C) (number average molecular weight of 1100 and HLB of 13.3) represented by the following chemical formula (III) (here, a+b+c=13 in the formula) was prepared at a concentration of 2% by weight.

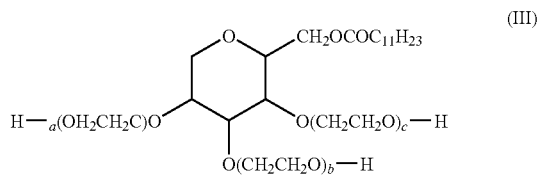

(III)

Reference Example 4

An aqueous solution of surfactant (D) (number average molecular weight of 4000 and HLB of 18.0) represented by the following chemical formula (IV) (where "n" in the formula is approximately 60) was prepared at a concentration of 3% by weight.

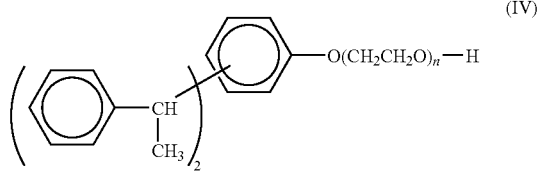

(IV)

Reference Example 5

An aqueous solution of an amphoteric surfactant (E) (number average molecular weight of 271) represented by the following chemical formula (V) was prepared at a concentration of 3% by weight.

(V)

[Preparation of Continuous Carbon Fiber Bundles]

Reference Example 6

Spinning and baking were performed for a copolymer containing polyacrylonitrile as a major component. Thus, a continuous carbon fiber bundle (F-1) with a total filament number of 24,000 was obtained. Characteristics of the continuous carbon fiber bundle were as follows.

| | |
|---|---|
| Mass per unit length | 1.7 g/m |
| Specific gravity | 1.8 g/cm³ |
| Tensile strength | 4.0 GPa |
| Tensile modulus of elasticity | 235 GPa |
| Arithmetic average roughness (Ra) | 3 nm |

Reference Example 7

Spinning and baking were performed for a copolymer containing polyacrylonitrile as a major component. Thus, a continuous carbon fiber bundle (F-2) with a total filament number of 48,000 was obtained. Characteristics of the continuous carbon fiber bundle were as follows.

| | |
|---|---|
| Mass per unit length | 3.3 g/m |
| Specific gravity | 1.8 g/cm³ |
| Tensile strength | 3.0 GPa |
| Tensile modulus of elasticity | 225 GPa |
| Arithmetic average roughness (Ra) | 30 nm |

[Production of Chopped Carbon Fiber for an Aqueous Process]

Example 1

The aqueous solution of the surfactant (A) prepared in reference example 1 was further diluted to obtain an aqueous solution with a concentration of 2.0% by weight. The continuous carbon fiber bundle (F-1) prepared in reference example 6 was immersed in the diluted aqueous solution, thereby causing adhesion of the sizing surfactant (A) as a sizing agent. The continuous carbon fiber bundle was dried using a hot air dryer at 200° C. for 2 minutes and then cut to a length of 6.4 mm using a cartridge cutter. Thus, chopped carbon fibers were obtained. The amount of the sizing agent that had adhered to the thus obtained chopped carbon fibers was 1.0% by weight.

Example 2

Chopped carbon fibers were obtained by a method similar to that employed in Example 1 except that the undiluted aqueous solution of the surfactant (A) prepared in reference example 1 was used. The amount of the sizing agent that had adhered was 10% by weight.

Example 3

The continuous carbon fiber bundle (F-1) prepared in reference example 6 was subjected to electrolytic surface treatment at 3 coulombs per gram of carbon fiber in an aqueous solution containing sulfuric acid as an electrolyte, thereby preparing a carbon fiber (F-3). Chopped carbon fibers were obtained by a method similar to that employed in Example 2 except that the obtained carbon fiber was used. The amount of the sizing agent that had adhered was 10% by weight.

Example 4

Chopped carbon fibers were obtained by a method similar to that employed in Example 1 except that the aqueous solution of the surfactant (B) prepared in reference example 2 was used as a sizing agent. The amount of the sizing that had adhered was 1.0% by weight.

Example 5

The carbon fiber (F-3) prepared in Example 3 was immersed in the aqueous solution of the surfactant (C) prepared in reference example 3, thereby causing adhesion of the surfactant as a sizing agent. The amount of the surfactant (C) that had adhered at this time was 0.7% by weight.

The aqueous solution of the surfactant (A) prepared in reference example 1 was further diluted to obtain an aqueous solution with a concentration of 1% by weight. A carbon fiber to which the surfactant (C) had adhered in advance was further immersed in the thus obtained aqueous solution, thereby causing adhesion of the surfactant as a sizing agent. Subsequently, the carbon fiber was dried by a method similar to that employed in Example 1, thereby obtaining chopped carbon fibers. The total amount of the sizing agents that had adhered was 1.0% by weight.

Example 6

The carbon fiber (F-1) prepared in reference example 6 was subjected to electrolytic surface treatment at 10 coulombs per gram of carbon fiber in an aqueous solution containing sulfuric acid as an electrolyte, thereby preparing a carbon fiber (F-4). Chopped carbon fibers were obtained by immersing the thus obtained carbon fiber in the aqueous solution of the surfactant (D) prepared in reference example 4, causing adhesion of the surfactant as a sizing agent, and then drying the carbon fiber by a method similar to that employed in Example 1. The amount of the sizing that had adhered was 1.0% by weight.

Example 7

The carbon fiber (F-1) prepared in reference example 6 was subjected to electrolytic surface treatment at 80 coulombs per gram of carbon fiber in an aqueous solution containing ammonium carbonate as an electrolyte, thereby preparing a carbon fiber (F-5).

The thus obtained carbon fiber was immersed in the aqueous solution of the surfactant (D) prepared in reference example 4, thereby causing adhesion of the surfactant as a sizing agent. The amount of the surfactant (D) that had adhered at this time was 1.0% by weight.

Furthermore, a carbon fiber to which the surfactant (D) had adhered in advance was further immersed in the aqueous solution of the surfactant (E) prepared in reference example 5, thereby causing adhesion of the surfactant as a sizing agent. Subsequently, chopped carbon fibers were obtained by drying the carbon fiber by a method similar to that employed in Example 1. The total amount of the sizing agents that had adhered was 1.3% by weight.

Example 8

The carbon fiber (F-2) prepared in reference example 7 was subjected to electrolytic surface treatment at 10 coulombs per gram of carbon fiber in an aqueous solution containing sulfuric acid as an electrolyte, thereby obtaining a carbon fiber. Chopped carbon fibers were obtained by a method similar to that employed for Example 6 except that the thus obtained carbon fiber was used. The amount of the sizing agent that had adhered was 1.0% by weight.

Example 9

The carbon fiber (F-4) prepared in Example 6 was immersed in the aqueous solution of the surfactant (D) prepared in reference example 4, thereby causing adhesion of the surfactant as a sizing agent. Thus carbon fiber strands were obtained. The amount of the sizing agent that had adhered was 1.0% by weight.

The thus obtained carbon fiber strands were pulled at a rate of 5 m/minute while being immersed in an aqueous dispersion solution of thermoplastic resin powders. The thermoplastic resin powders used herein were prepared by powdering a PPS resin (Torelina M2588, produced by Toray Industries, Inc.) to an average particle diameter of 50 μm. The carbon fiber strands repeatedly underwent separation and convergence due to tension in the aqueous dispersion solution, so that the thermoplastic resin powders sufficiently adhered to the inside of the fiber bundles.

Next, air was blown at the carbon fiber strands by air-blowing so as to remove water, which was the dispersion medium. The strands were then caused to pass through a first drying oven (400° C.), a second drying oven (300° C.), and a third drying oven (200° C.), in such order. At this time, the PPS resin also melted, impregnated the fiber bundles, and then cooled and solidified, so that a thermoplastic yarn prepreg could be produced.

Comparative Example 1

The continuous carbon fiber bundle prepared in reference example 6 was immersed in water and cut to a length of 6.4 mm using a cartridge cutter, thereby obtaining chopped carbon fibers.

Comparative Example 2

The carbon fiber (F-4) prepared in Example 6 was immersed in an aqueous solution of a (G) polyethylene emulsion (Sepolsion G, produced by Sumitomo Seika Chemicals Co., Ltd.) to be used as a sizing agent, which had been prepared at a concentration of 2.0% by weight. Hence, adhesion of the sizing agent took place. Subsequently, the carbon fiber was dried by a method similar to that employed in Example 1, thereby preparing chopped carbon fibers. The amount of the sizing agent that had adhered was 1.0% by weight.

Comparative Example 3

The continuous carbon fiber bundle (F-3) prepared in Example 3 was immersed in an aqueous solution of an (H) epoxy resin (DENACOL EX-611 produced by Nagase ChemiteX Corporation) to be used as a sizing agent, which had been prepared at a concentration of 1.2% by weight. Hence, adhesion of the sizing agent took place. Subsequently, the carbon fiber bundle was dried by a method similar to that employed in Example 1, thereby preparing chopped carbon fibers. The amount of the sizing agent that had adhered was 0.6% by weight.

Comparative Example 4

The carbon fiber (F-5) prepared in Example 7 was cut to a length of 6.4 mm by a method similar to that employed in Comparative example 1 using a cartridge cutter, thereby obtaining chopped carbon fibers.

Comparative Example 5

The carbon fiber (F-1) prepared in reference example 6 was immersed in an aqueous solution of a (J) surfactant (number average molecular weight of 362 and HLB of 9.7) represented by the following structural formula (VI) to be used as a sizing agent, which had been prepared at a concentration of 2.0% by weight. Hence, adhesion of the sizing agent took place. Subsequently, the carbon fiber was dried by a method similar to that employed in Example 1, thereby preparing chopped carbon fibers. The amount of the sizing agent that had adhered was 1.0% by weight.

$$C_{12}H_{25}O\text{—}(CH_2CH_2O)_4\text{—}H \quad (VI)$$

The results of evaluating the characteristics of the carbon fibers obtained in Examples 1 to 4 and Comparative examples 1 to 3 and 5 are summarized in the following Table 1.

As shown in Table 1, each of the carbon fibers of Examples 1 to 5 had a surface oxygen concentration O/C of 0.03 or more and less than 0.12, and a first contact angle formed with water within the range according to the present invention, as a result of the effect of each surfactant. Hence, these carbon fibers are excellent in terms of dispersibility. In particular, each of the carbon fibers of Examples 1, 2, and 5 exhibited a short dispersion time, so that excellent fiber dispersion effects can be obtained therewith. Moreover, as also shown in Table 1, convergence properties of practical levels can be obtained with these carbon fibers.

In the meantime, the carbon fiber of Comparative example 1 had insufficient convergence properties because no sizing agent had adhered thereto, and it thus is inferior to other carbon fibers in terms of dispersion time. The carbon fibers of Comparative examples 2 and 3 had insufficient dispersibility because no surfactant had adhered thereto, so that application of the carbon fibers to an aqueous process is difficult. A surfactant had adhered to the carbon fiber of Comparative example 5. However, the first contact angle was outside the range according to the present invention because of interaction of the surfactant with the carbon fiber, hydrophilicity, and the like. Hence, sufficient dispersibility cannot be obtained with the use of the carbon fiber of Comparative example 5.

The results of evaluating the characteristics of the carbon fibers obtained in Examples 6 to 9 and Comparative example 4 are summarized in the following Table 2.

TABLE 1

|  |  | Example 1 | Example 2 | Example 3 | Example 4 | Example 5 | Comparative example 1 | Comparative example 2 | Comparative example 3 | Comparative example 5 |
|---|---|---|---|---|---|---|---|---|---|---|
| Surface oxygen index O/C |  | — | 0.05 | 0.05 | 0.10 | 0.05 | 0.10 | 0.05 | 0.10 | 0.10 | 0.05 |
| Sizing agent type |  | — | (A) | (A) | (A) | (B) | (C)/(A) | None | (G) | (H) | (J) |
| Amount of sizing agent that has adhered | % by weight | 1.0 | 10.0 | 10.0 | 1.0 | 0.7/0.3 | — | 1.0 | 0.6 | 1.0 |
| First contact angle with water (mean value*) | Degree of the angle | 70 (82) | 65 (73) | 63 (73) | 65 (77) | 65 | 90 (90) | 75 (75) | 60 (60) | 80 |
| Surface free energy |  |  |  |  |  |  |  |  |  |  |
| $\gamma_0$ ($\gamma_0$**) | mJ/m² | 36 (34) | 40 (37) | 42 (40) | 39 (36) | 43 | 32 | 40 | 42 | 43 |
| $\gamma_{OP}$ ($\gamma_{OP}$**) | mJ/m² | 13 (5) | 15 (7) | 15 (9) | 16 (8) | 13 | 2 | 10 | 16 | 13 |
| $\gamma_1$ | mJ/m² | 32 | 32 | 40 | 32 | 40 | 32 | 43 | 40 | 40 |
| Convergence properties | — | ○ | ○ | ○ | ○ | ○ | x | ○ | ○ | ○ |
| Openability | — | ○○ | ○○ | ○ | ○ | ○○ | Δ | x | x | Δ |
| Fiber-opening time | second | 25 | 20 | 35 | 30 | 20 | 60 | >300 | >300 | 60 |
| Overall evaluation | — | ○○ | ○○ | ○ | ○ | ○○ | Δ | x | x | Δ |

*The mean value of contact angles with water obtained by four separate measurements.
**A contact angle with water was calculated using the mean value of four separate measurements.

TABLE 2

|  |  | Example 6 | Example 7 | Example 8 | Example 9 | Comparative example 4 |
|---|---|---|---|---|---|---|
| Surface oxygen index O/C | — | 0.15 | 0.25 | 0.15 | 0.15 | 0.25 |
| Sizing agent type | — | (D) | (D)/(E) | (D) | (D) | None |
| Amount of sizing agent that has adhered | % by weight | 1.0 | 1.0/0.3 | 1.0 | 1.0 | — |
| First contact angle with water | Degree of the angle | 55 | 30 | 47 | 55 | 45 |
| Surface free energy |  |  |  |  |  |  |
| $\gamma_0$ | mJ/m$^2$ | 50 | 60 | 52 | 50 | 55 |
| $\gamma_{OP}$ | mJ/m$^2$ | 24 | 37 | 26 | 24 | 28 |
| $\gamma_1$ | mJ/m$^2$ | 47 | 55 | 47 | 47 | 55 |
| Convergence properties | — | ○ | ○ | ○ | — | x |
| Openability | — | ○○ | ○○ | ○○ | — | Δ |
| Fiber-opening time | Second | 20 | 25 | 20 | — | 90 |
| Overall evaluation | — | ○○ | ○○ | ○○ | ○○ | x |

As shown in Table 2, each of the carbon fibers of Examples 6 and 8 had a surface oxygen concentration O/C of 0.12 or more and less than 0.20, and a first contact angle formed with water within the range according to the present invention, as a result of the effect of each surfactant. Hence, these carbon fibers are excellent in terms of dispersibility. Moreover, as also shown in Table 2, convergence properties of practical levels can be obtained with these carbon fibers.

The carbon fiber of Example 7 had a surface oxygen concentration O/C of 0.20 or more and less than 0.30, and a first contact angle formed with water within the range according to the present invention because of the effect of the surfactant. Hence, the carbon fiber is excellent in terms of dispersibility. The carbon fiber of Comparative example 4 had insufficient convergence properties because no sizing agent had adhered thereto. Even when compared with the carbon fiber of Comparative example 1, the carbon fiber of Comparative example 4 exhibited further aggravated dispersion time because of the effect of surface treatment.

As described above, any carbon fibers of Examples 1 to 8 have applicability to an aqueous process such as a paper-making process and convergence properties.

INDUSTRIAL APPLICABILITY

According to the present invention, a carbon fiber excellent in terms of convergence properties can be obtained, which make it appropriate for cutting into chopped carbon fibers and allow handling of the same. The carbon fiber is also excellent in terms of dispersibility of fiber bundles, which makes it appropriate for an aqueous process. In particular, the carbon fiber displays excellent dispersibility upon dispersion in an aqueous medium. The carbon fiber is suitably used for production of carbon fiber paper substrates represented by electrode substrates for fuel cells, intermediate substrates for molding, and the like. However, the application range of the carbon fiber is not limited thereto.

The invention claimed is:

1. A water dispersible carbon fiber, which is formed by convergence of a plurality of single fibers, wherein the surface oxygen concentration (O/C) of each of the single fibers is 0.03 or more and less than 0.12 as measured by X-ray photoelectron spectroscopy (ESCA) and a sizing agent containing a surfactant as a major component in an amount of 70% by weight or more is adhered to the single fibers, said carbon fiber forming a first contact angle with water of 75° or less as measured by the Wilhelmy method.

2. The water dispersible carbon fiber according to claim 1, wherein the surface free energy $\gamma_0$ of each of the single fibers ranges from 30 mJ/m$^2$ to 50 mJ/m$^2$, the polar component $\gamma_{OP}$ of the surface free energy ranges from 10 mJ/m$^2$ to 20 mJ/m$^2$, as measured by the Wilhelmy method, and the surface free energy $\gamma_1$ after removal of the surfactant is $\gamma_0$ or less.

3. The water dispersible carbon fiber according to claim 1, wherein the surfactant is a nonionic surfactant with an HLB (Hydrophile-Lipophile Balance) value ranging from 10 to 20.

4. The water dispersible carbon fiber according to claim 3, wherein the surfactant contains at least two types of components: a nonionic surfactant with an HLB value ranging from 10 to 14; and a nonionic surfactant with an HLB value ranging from 14 to 20.

5. The water dispersible carbon fiber according to claim 1, wherein the surfactant contains a polyoxyalkylene group with a molecular formula weight ranging from 600 to 4000.

6. The water dispersible carbon fiber according to claim 5, wherein the surfactant contains a hydrophobic portion composed of a hydrocarbon with a carbon number of 6 or more.

7. The water dispersible carbon fiber according to claim 1, wherein the amount of the sizing agent that is adhered ranges from 0.01% by weight to 10% by weight.

8. The water dispersible carbon fiber according to claim 1, wherein the surfaces of the single fibers composing the carbon fiber each have arithmetic average roughness (Ra) of 20 nm or more, as measured using an AFM (atomic force microscope).

9. The water dispersible carbon fiber according to claim 1, wherein the carbon fiber is formed by convergence of 10,000 to 60,000 single fibers.

10. A water dispersible chopped carbon fiber, which is prepared by cutting the carbon fiber according to claim 1 to a fiber length ranging from 3 mm to 30 mm.

11. The water dispersible chopped carbon fiber according to claim 10, the longest dispersion time of which is 40 seconds or less, as measured by a method for evaluating dispersibility in water.

12. A water dispersible carbon fiber, which is formed by convergence of a plurality of single fibers, wherein the surface oxygen concentration (O/C) of each of the single fibers is 0.12 or more and less than 0.20 as measured by X-ray photoelectron spectroscopy (ESCA) and a sizing agent containing a surfactant as a major component in an amount of 70% by weight or more is adhered to the single fibers, said carbon fiber forming a first contact angle with water of 65° or less as measured by the Wilhelmy method.

13. The water dispersible carbon fiber according to claim 12, wherein the surface free energy $\gamma_0$ of each of the single fibers ranges from 40 mJ/m$^2$ to 60 mJ/m$^2$, the polar component $\gamma_{0P}$ of the surface free energy ranges from 20 mJ/m$^2$ to 30 mJ/m$^2$, as measured by the Wilhelmy method, and the surface free energy $\gamma_1$ after removal of the surfactant is $\gamma_0$ or less.

14. A water dispersible carbon fiber, which is formed by convergence of a plurality of single fibers, wherein the surface oxygen concentration (O/C) of each of the single fibers is 0.20 or more and 0.30 or less as measured by X-ray photoelectron spectroscopy (ESCA) and a sizing agent containing a surfactant as a major component in an amount of 70% by weight or more is adhered to the single fibers, said carbon fiber forming a first contact angle with water of 55° or less as measured by the Wilhelmy method.

15. The water dispersible carbon fiber according to claim 14, wherein the surface free energy $\gamma_0$ of each of the single fibers ranges from 50 mJ/m$^2$ to 70 mJ/m$^2$, the polar component $\gamma_{0P}$ of the surface free energy ranges from 30 mJ/m$^2$ to 40 mJ/m$^2$, as measured by the Wilhelmy method, and the surface free energy $\gamma_1$ after removal of the surfactant is $\gamma_0$ or less.

* * * * *